C. Doane.
Ovens.
Nº 6,772. Patented Oct. 9. 1849.
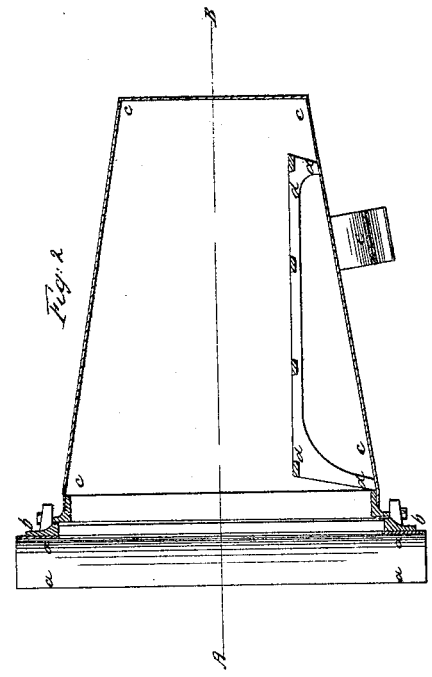
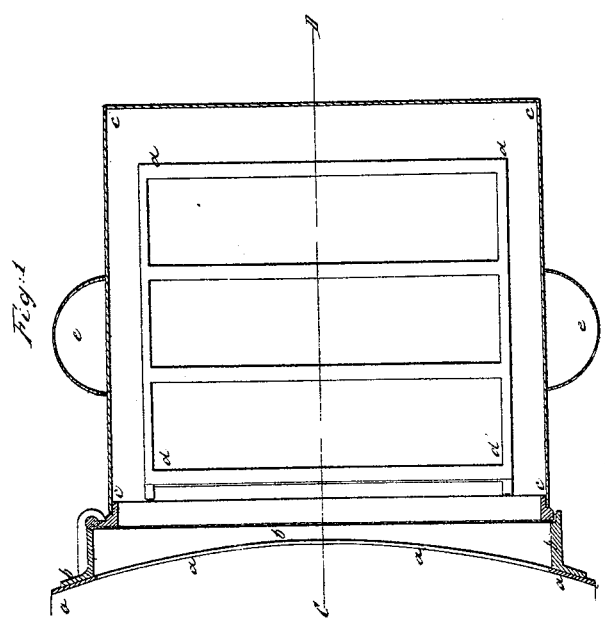

UNITED STATES PATENT OFFICE.

CALVIN DOANE, OF WAREHAM, MASSACHUSETTS.

PORTABLE OVEN.

Specification of Letters Patent No. 6,772, dated October 9, 1849.

*To all whom it may concern:*

Be it known that I, CALVIN DOANE, of Wareham, in the county of Plymouth and State of Massachusetts, have invented a new and useful Portable Oven to be Combined with a Common Cylindrical Air-Tight Stove, and that the following description, taken in connection with the accompanying drawings, hereinafter referred to, forms a full and exact specification of the same, wherein I have set forth the nature and principles of my said improvements by which my invention may be distinguished from others of a similar class, together with such parts as I claim and desire to have secured to me by Letters Patent.

The figures of the accompanying plate of drawings represent my improvements. Figure 1 is a detail horizontal section of a portion of a common cylindrical air tight stove, with my improved portable oven attached; said section being taken in the plane of the line, A B, Fig. 2, and Fig. 2 is a detail vertical section of the same arrangement, taken in the plane of the line, C D, Fig. 1.

In the use of the various kinds of parlor stoves, there is frequently felt a want of some contrivance or appliance for performing the lighter culinary operations, so as to avoid the necessity of making a second fire for them. Various plans have been devised for boiling spaces, &c., on the top of such stoves; but a portable oven for baking, roasting, &c., has never been common with the common form of air-tight stoves now so generally in use, and this convenience is secured by my improvements.

*a a a a*, Figs. 1 and 2, represent a portion of the cylindrical casing of an air tight stove. To the exterior of this casing, and extending from about two inches below the smoke pipe, to within six inches of the top of the hearth, is riveted or otherwise properly fastened, a rectangular cast-iron oven frame, *b b b b*, curved so as to conform to the periphery of the stove.

*c c c c*, Figs. 1 and 2, is the portable oven made of tinned iron, and hinged to the said oven frame, *b b b b*, so as to be easily unshipped, and set away like any other cooking utensil.

The said oven is of a trapezoidal shape, the top and bottom converging as shown in Fig. 2, so as to reflect the heat toward the article to be baked, or otherwise cooked, which is supported on the movable grating, *d d d d*, the feet of which rest on the bottom of the oven, and are so arranged, as to length, as to bring the top of said grating horizontal, as shown in said Fig. 2. On the sides of the oven handles, *e e*, are soldered, by which the oven can be conveniently lifted from, or placed on its hinge bearings, on the oven frame, *b b b b*.

It will readily be perceived from inspection of the drawings, that a considerable heat will be radiated through the periphery, *a a a a*, of the stove into the portable oven, which heat by the conveyance of the top and bottom of the oven, will be brought to bear upon the article to be cooked therein as hereinbefore suggested.

Having thus described my improvements, I shall state my claim as follows:

What I claim as my invention, and desire to have secured to me by Letters Patent is,

The combination with the back of a common cylindrical air tight stove, of an oven frame, and a portable trapezoidal oven, susceptible of being hinged to, or unhinged from, said frame, as hereinabove set forth.

In testimony that the foregoing is a true description of my said invention I have hereto set my signature this ninth day of May A. D. 1849.

CALVIN DOANE.

Witnesses:
EZRA LINCOLN, Jr.,
JOSEPH GAVETT.